US010399476B2

(12) United States Patent
Ranganathan et al.

(10) Patent No.: US 10,399,476 B2
(45) Date of Patent: Sep. 3, 2019

(54) INTEGRATED HANDLE AND HOUSING

(71) Applicant: Ford Global Technologies, LLC, Dearborn, MI (US)

(72) Inventors: Shivraj Ranganathan, Royal Oak, MI (US); Manjil Kale, Canton, MI (US); Robert Michael Coury, Belleville, MI (US); Stephen Neal Jacobsen, Plymouth, MI (US); Daniel A. Jammoul, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/882,095

(22) Filed: Jan. 29, 2018

(65) Prior Publication Data

US 2019/0232877 A1    Aug. 1, 2019

(51) Int. Cl.
*B60N 3/02* (2006.01)
*B60R 7/08* (2006.01)
*B60R 7/10* (2006.01)
*B60R 7/04* (2006.01)

(52) U.S. Cl.
CPC ............... *B60N 3/023* (2013.01); *B60R 7/04* (2013.01); *B60R 7/082* (2013.01); *B60R 7/10* (2013.01)

(58) Field of Classification Search
CPC .. B60R 7/08; B60R 7/10; B60R 7/081–7/088; B60R 7/14; B60N 3/023

USPC .................................................. 206/214, 37.7
See application file for complete search history.

(56) References Cited

U.S. PATENT DOCUMENTS

| 5,267,761 | A | 12/1993 | Curtindale et al. |
| 5,620,127 | A * | 4/1997 | MacKenzie ........ A47G 25/1457 223/89 |
| 6,234,570 | B1 | 5/2001 | Quinno et al. |
| 6,397,435 | B1 * | 6/2002 | Gosselet ................ B60N 3/023 16/438 |
| 8,827,516 | B2 | 9/2014 | Stakoe et al. |
| 9,079,542 | B1 | 7/2015 | Ross et al. |

FOREIGN PATENT DOCUMENTS

CN    204236353 U    4/2015
CN    204567374 U    8/2015

* cited by examiner

*Primary Examiner* — Dennis H Pedder
(74) *Attorney, Agent, or Firm* — Vichit Chea; Price Heneveld LLP

(57) ABSTRACT

A vehicle headliner assembly includes a headliner, a handle, a housing, and a pivotable coupling. The pivotable coupling defines an axis. The handle and the housing are operably coupled to the pivotable coupling. The handle is selectively rotatable about the pivotable coupling from a stowed position to a deployed position. The housing is selectively rotatable about the pivotable coupling from a closed position to an open position.

19 Claims, 8 Drawing Sheets

INTEGRATED HANDLE AND HOUSING

FIELD OF THE DISCLOSURE

The present disclosure generally relates to a handle assembly for a vehicle including a handle and a housing for storing a passenger item.

BACKGROUND OF THE DISCLOSURE

Convenient, accessible, compact storage spaces in vehicles have become increasingly important as passengers spend more time in vehicles.

A variety of storage solutions within a vehicle interior for personal items such as sunglasses are known. It is known to store sunglasses in designated storage spaces in consoles, pockets in door trim, and glove compartments. It is desirable to utilize minimal vehicle interior volume when storing sunglasses. Further, it is desirable to store sunglasses in an accessible vehicle location.

SUMMARY OF THE DISCLOSURE

According to one aspect of the present disclosure, a vehicle headliner assembly includes a headliner, a handle, a housing, and a pivotable coupling that defines an axis. The handle and the housing are operably coupled to the pivotable coupling. The handle is selectively rotatable about the pivotable coupling from a stowed position to a deployed position. The housing is selectively rotatable about the pivotable coupling from a closed position to an open position. The pivotable coupling is attached to the headliner.

Embodiments of the first aspect of the disclosure can include any one or a combination of the following features:
- the pivotable coupling comprises a pin that extends through the handle and an edge of the housing;
- the headliner, the handle, and the housing are proximate a ceiling and the pin is mounted to the ceiling;
- the housing is nested within the handle;
- a friction hinge is selectively activated to move the handle between stowed and deployed positions;
- a push-push mechanism is selectively activated to move the housing between closed and open positions;
- an outer edge of the housing is adjacent to an inner edge of the handle;
- the housing is configured to receive a pair of sunglasses;
- a hook, wherein the hook is nested within the handle and wherein the hook is activated from a non-use position to a use position;
- the hook is selectively rotated about the axis between non-use and use positions;
- the hook is attached to the pivotable coupling;
- the handle, the housing, and the hook are rotatable about the pivotable coupling; and/or
- the pivotable coupling is a pin.

According to a second aspect of the present disclosure, a handle assembly for a vehicle includes an elongated member mounted to a vehicle interior, a handle pivotably coupled to the elongated member, and a container pivotably coupled to the elongated member. An inner periphery of the handle surrounds an outer periphery of the container when the handle is in a stowed position and the container is in a closed position.

Embodiments of the second aspect of the disclosure can include any one or a combination of the following features:
- an opening of the container is accessible when the container is in the open position and the handle is in the stowed position;
- the elongated member defines an axis;
- a hook, wherein the hook is pivotably coupled to the elongated member; and/or
- an interior volume of the container is defined by the interior of the container and a ceiling.

According to a third aspect of the disclosure, a deployable handle assembly includes a pin, a handle, a container, and a hanger. The handle, the container, and the hanger are mounted on the pin. The handle is selectively rotatable between stowed and deployed positions. The container is selectively rotatable between closed and open positions. The hanger is selectively rotatable between non-use and use positions. The pin is fixed to a vehicle frame.

Embodiments of the third aspect of the disclosure can include any one or a combination of the following features:
- the pin defines an axis; and/or
- the handle comprises a first end and a second end, the container is nested within the handle and between the first end and the second end, and the hanger is nested within one of the first and second ends of the handle.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
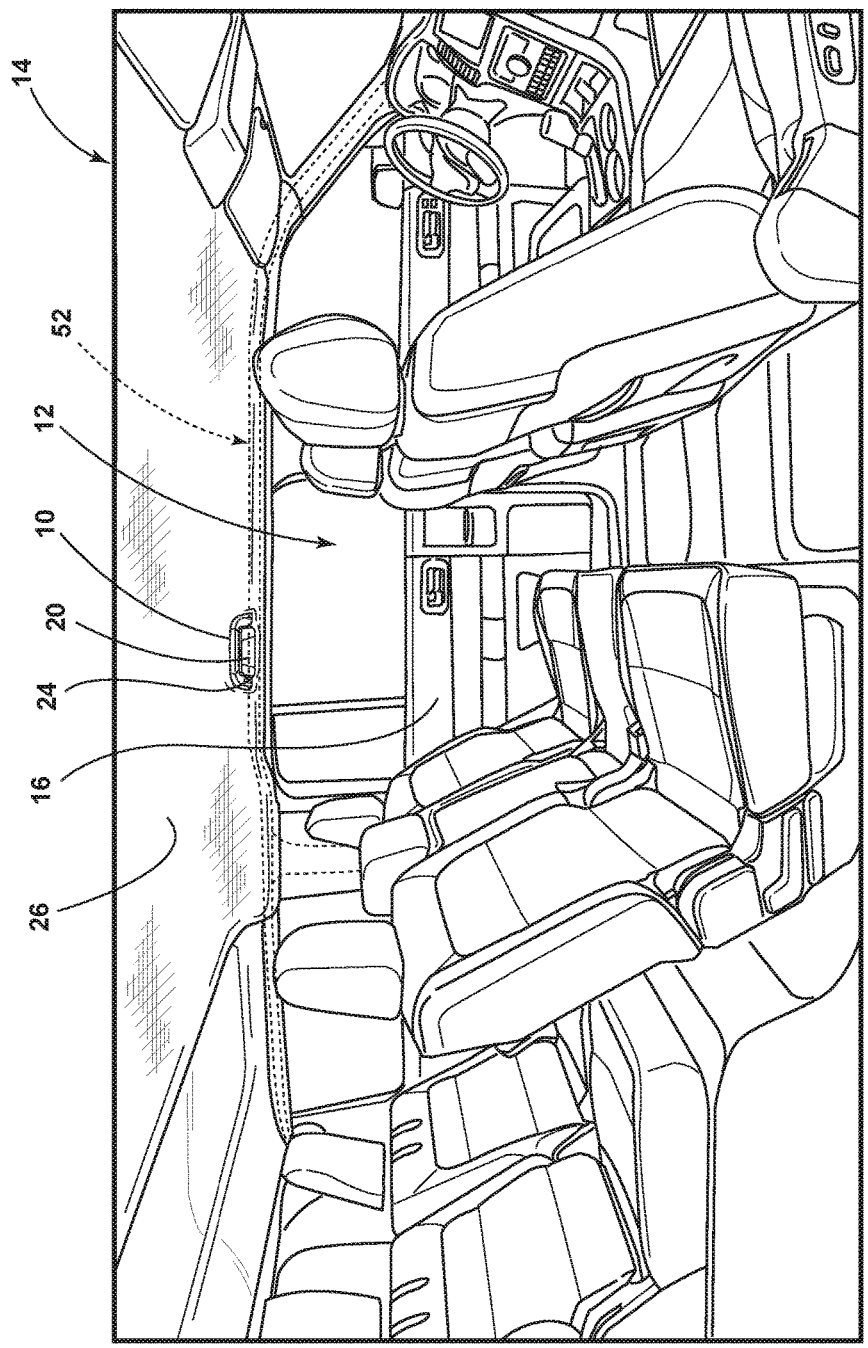
FIG. 1 is a side perspective view of a headliner assembly in a vehicle interior of an aspect of the disclosure.

For purposes of the description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the aspects disclosed herein are not to be considered as limiting, unless the claims expressly state otherwise.

Referring to FIG. 1, a handle 10 is shown inside a cabin 12 of a vehicle 14. The handle 10 is located proximate the rear driver side door 16 so that a passenger may use the handle 10 to aid the passenger in entering and exiting the vehicle 14. The passenger may grab the handle 10 for support as he or she occupies, enters, and exits the vehicle 14. The handle 10 supports the weight of the passenger. A housing 20 is nested within the handle 10. The passenger may store passenger items in the housing 20. The passenger may activate the housing 20 to an open position to access the interior of the housing 20 and to insert a passenger item into the housing 20. Similarly, the passenger may move the housing 20 to an open position to access the interior of the housing and to retrieve a passenger item from the housing 20. In the depicted aspect, a hook 24 is nested within the handle 10. The hook 24 is selectively activable from a first non-use position to a use position. In a use position, the hook 24 provides the passenger a convenient place to hang a passenger item (for example, a coat). In the depicted aspect, the handle 10 is attached to the vehicle headliner 26.

Figure 2:
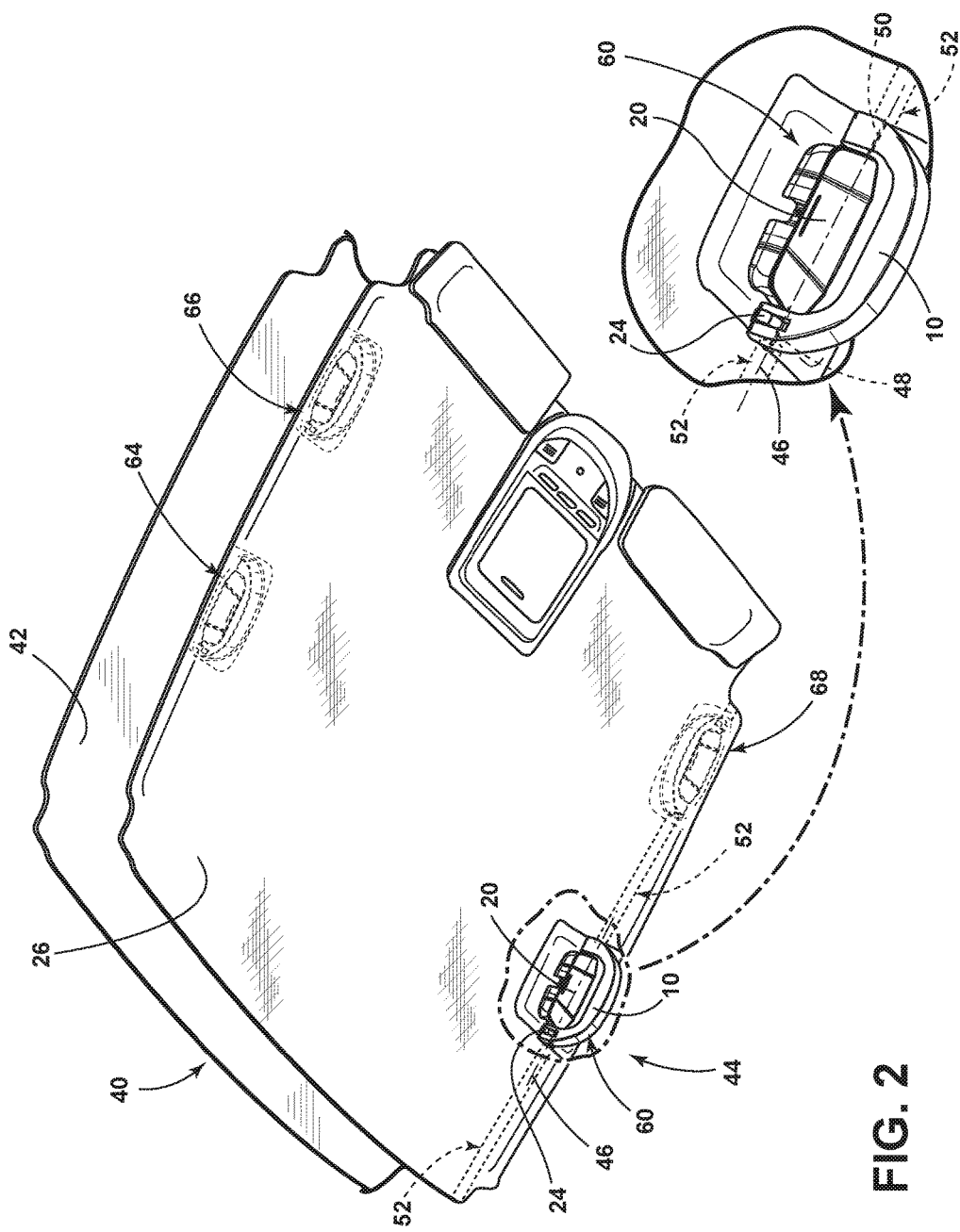
FIG. 2 is a bottom perspective view of a headliner assembly for a vehicle interior of an aspect of the disclosure.

Referring to FIG. 2, an exploded view of a vehicle ceiling area 40 is shown. The headliner 26 is shown proximate a vehicle roof 42. In the depicted aspect, the vehicle headliner assembly 44 includes a headliner 26, a handle 10, a housing 20, and a pivotable coupling that defines a first axis 46. The pivotable coupling can include first and second pins 48, 50. The handle 10 and the housing 20 are operably coupled to the pivotable coupling and each rotates about the first axis 46. The handle 10 is selectively rotatable about the pivotable coupling from a stowed position to a deployed position. The housing 20 is selectively rotatable about the pivotable coupling from a closed position to an open position. The handle 10 is shown in the stowed position in FIGS. 1, 3, 5, and 6. The handle 10 is shown in the deployed position in FIGS. 2 and 4. The housing 20 is shown in the closed position in FIGS. 1, 2, 3, 4, and 6. The housing 20 is shown in the open position in FIG. 5. The headliner 26, the handle 10, and the housing 20 are proximate the roof 42. The first pin 48 is mounted to the frame 52. The second pin 50 is mounted to the frame 52. In various aspects, the first pin 48 and the second pin 50 protrude through headliner 26 to mount to the frame 52. In various aspects, the frame 52 may be shaped so that first pin 48 and second pin 50 attach directly to the frame 52.

Referring again to FIG. 2, a handle assembly 60 positioned along headliner 26 includes an elongated member (e.g., first pin 48, second pin 50) mounted to a vehicle interior 62, a handle 10 pivotably coupled to the elongated member, and a container (e.g., housing 20) pivotably coupled to the elongated member. In the depicted aspect, the elongated member comprises the first pin 48 and the second pin 50. It is to be understood that the handle assembly 60 could be located in various locations throughout the vehicle interior 62 other than the illustrated location, such as in the headliner 26 area above a passenger side rear door (handle assembly 64), above a passenger side front door (handle assembly 66), and/or above a driver side front door (handle assembly 68). It is also conceivable that the handle assembly 60 could be located elsewhere in the vehicle. For example, the handle assembly 60 could be located on the A-pillar or the B-pillar.

In certain conditions, when a passenger desires a convenient storage location for his or her sunglasses, the housing 20 nested within the handle 10 provides a visually appealing, compact, and accessible storage space. Convenient storage of sunglasses in the housing 20 enhances passenger comfort and well-being.

Figure 3:
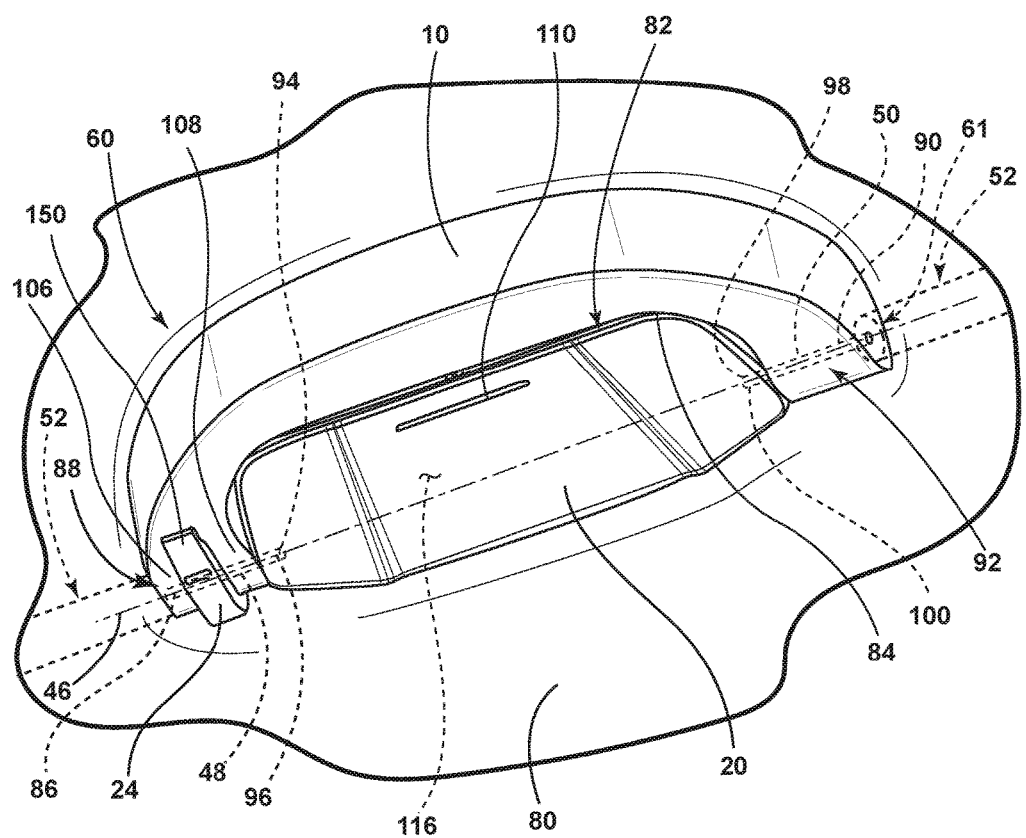
FIG. 3 is a side perspective view of a handle assembly with a handle in a stowed position, a housing in a closed position, and a hook in a first non-use position of an aspect of the disclosure.
Figure 4:
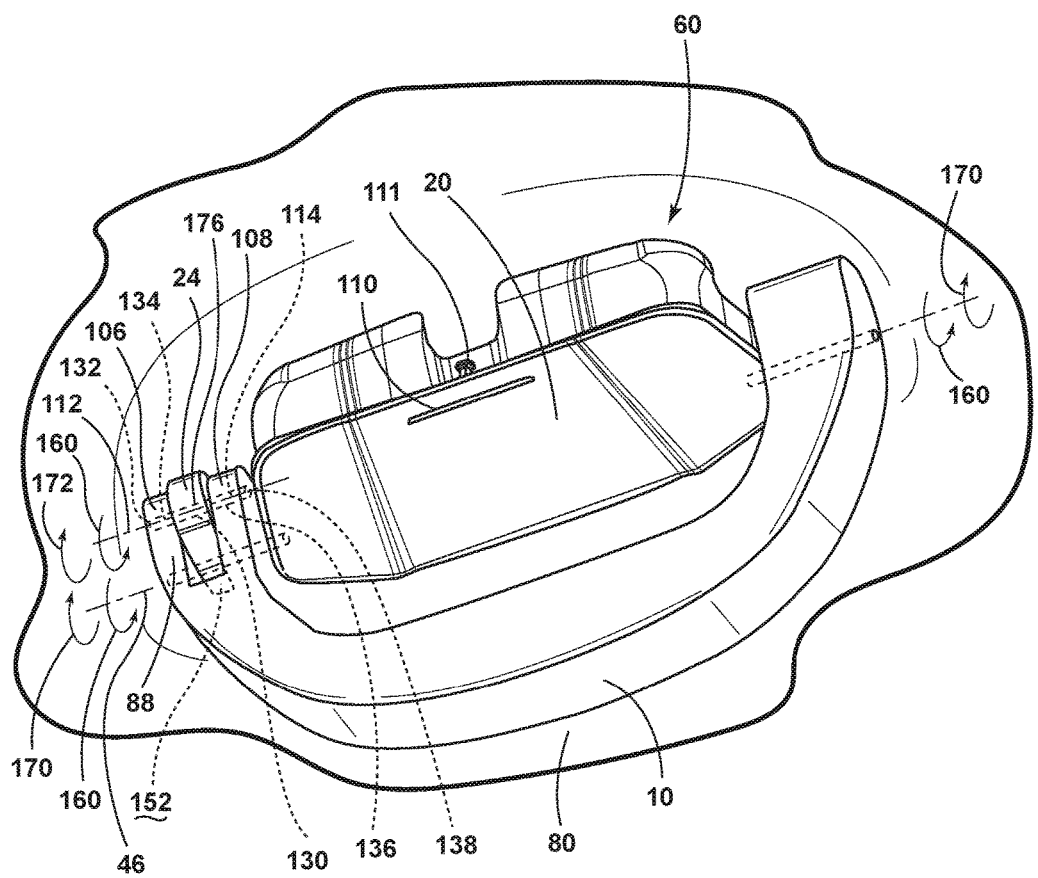
FIG. 4 is a side perspective view of an aspect of the handle assembly, shown with the handle in the deployed position, the housing in the closed position, and the hook in a second non-use position of an aspect of the disclosure.

Referring to FIG. 3, the handle assembly 60 is mounted to ceiling 80. The handle assembly 60 includes a first pin 48 and a second pin 50. In the depicted aspect, the handle 10 is pivotably coupled to the first pin 48 and the second pin 50. The housing 20 is pivotably coupled to the first pin 48 and the second pin 50. An inner periphery 82 of the handle 10 surrounds an outer periphery 84 of the housing 20 when the handle 10 is in a stowed position and the housing 20 is in a closed position. In various aspects, the handle assembly 60 includes a hook 24. In the depicted aspect, the pivotable coupling includes a first pin 48 that extends through a bore 86 in the first portion 88 of the handle 10 and a second pin 50 that extends through a bore 90 in the second portion 92 of the handle 10. The housing 20 has a first recess 94 for receiving a second end 96 of the first pin 48. The housing 20 has a second recess 98 for receiving a first end 100 of the second pin 50. In the depicted aspect, the hook 24 is nested between a first side 106 and a second side 108 of the first portion 88 of the handle 10. Actuating portion 110 is depressed to open and close the housing 20. In various aspects, actuating portion 110 activates a push-push mechanism 111. In various aspects, the pivotable coupling may include a hinge 61. Referring to FIG. 4, showing an alternate aspect, the hook 24 can rotate about a second axis 112 defined by a third pin 114.

Figure 5:
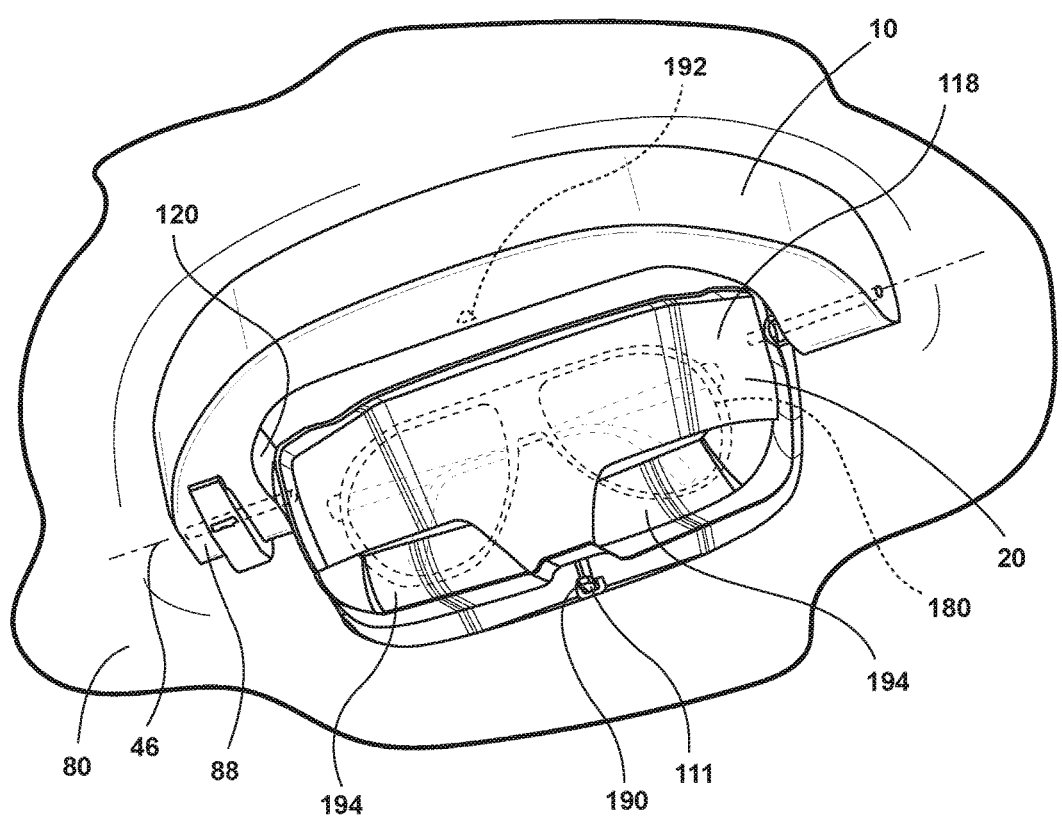
FIG. 5 is a side perspective view of the handle assembly of FIG. 3 with the handle in the stowed position, the housing in an open position, and the hook in a first non-use position of an aspect of the disclosure.

As shown in FIGS. 3, 4, and 5, when the handle 10 is in the stowed position and the housing 20 is in the closed position, an interior volume 116 of the housing 20 is defined by the interior surfaces 118 of the housing 20 and the ceiling 80. In various aspects, when the handle is in the stowed position and the housing is in the closed position, the interior wall 120 of the handle 10 may further define the interior volume 116 of the housing 20.

Referring to FIG. 4, the handle assembly 60 is shown with the handle 10 in the deployed position and the housing 20 in the closed position. The hook 24 is mounted to the third pin 114. In the depicted aspect, the hook 24 is attached to the handle 10 with a pivotable coupling. In the depicted aspect, the pivotable coupling is a third pin 114 located between the first side 106 and the second side 108 of the first portion 88 of the handle 10. The third pin 114 extends through a tunnel 130 in the hook 24. The handle 10 has a first slot 132 for receiving a first end 134 of the third pin 114. The handle 10 has a second slot 136 for receiving a second end 138 of the third rod 114. The hook 24 may be positioned in a variety of positions including a first non-use position, a use position, and a second non-use position. The hook 24 is shown in the first non-use position in FIGS. 1, 3, and 5. The hook 24 is shown in the use position in FIG. 6. The hook 24 is shown in the second non-use position in FIGS. 2 and 4.

Referring again to FIG. 3, the hook 24 includes a catch portion 150. When the handle 10 is in the stowed position and the hook 24 is in a first non-use position, an inner surface 152 of the catch portion 150 is generally contiguous with an outer surface 154 of the first portion 88 of the handle 10. Referring to FIG. 4, when the handle 10 moves from the stowed position to the deployed position, the hook 24 rotates around the third pin 114.

In various aspects of the disclosure, when the handle 10 moves from the stowed position to the deployed position, it rotates about the first axis 46 in the direction depicted by arrows 160. When the handle 10 moves from the deployed position to the stowed position, it rotates about the first axis 46 in a direction depicted by arrows 170. If the hook 24 is in the use position, movement of the handle 10 from the stowed position to the deployed position can engage the hook 24 within the handle 10. In various aspects, as shown in FIGS. 3, 5-8, the first axis 46 and the second axis 112 may be co-linear. It is also contemplated that the hook 24 can operate about the second axis 112 positioned eccentric to the first axis 46, as shown in FIG. 4. In such an aspect, the second axis 112 rotates about the first axis 46. Typically, the hook 24 moves independent of the handle 10 and the housing 20. The hook 24 can rotate about the second axis 112 in the directions depicted by arrows 160 and 172.

Referring to FIG. 5, the handle 10 is shown in the stowed position, the housing 20 is shown in the open position, and the hook 24 is shown in the first non-use position. The housing 20 is configured to receive sunglasses 180. Referring to FIGS. 3-4, housing 20 includes an actuating portion 110. When the housing 20 is closed and a passenger depresses the actuating portion 110, the push-push mechanism 111 or similar latching mechanism in the housing 20 releases the housing 20 from the closed position. When the housing is moved from the open position to the closed position, the push-push mechanism 111 engages to retain the housing in the closed position. Referring again to FIG. 5, in various aspects, the push-push mechanism 111 may include a protuberance 190 that selectively engages and disengages with a hollowed-out portion 192 in the handle 10. The housing 20 includes interior surface 118. The housing 20 includes scalloped portions 194, for retaining the sunglasses 180 in the housing 20.

Figure 6:
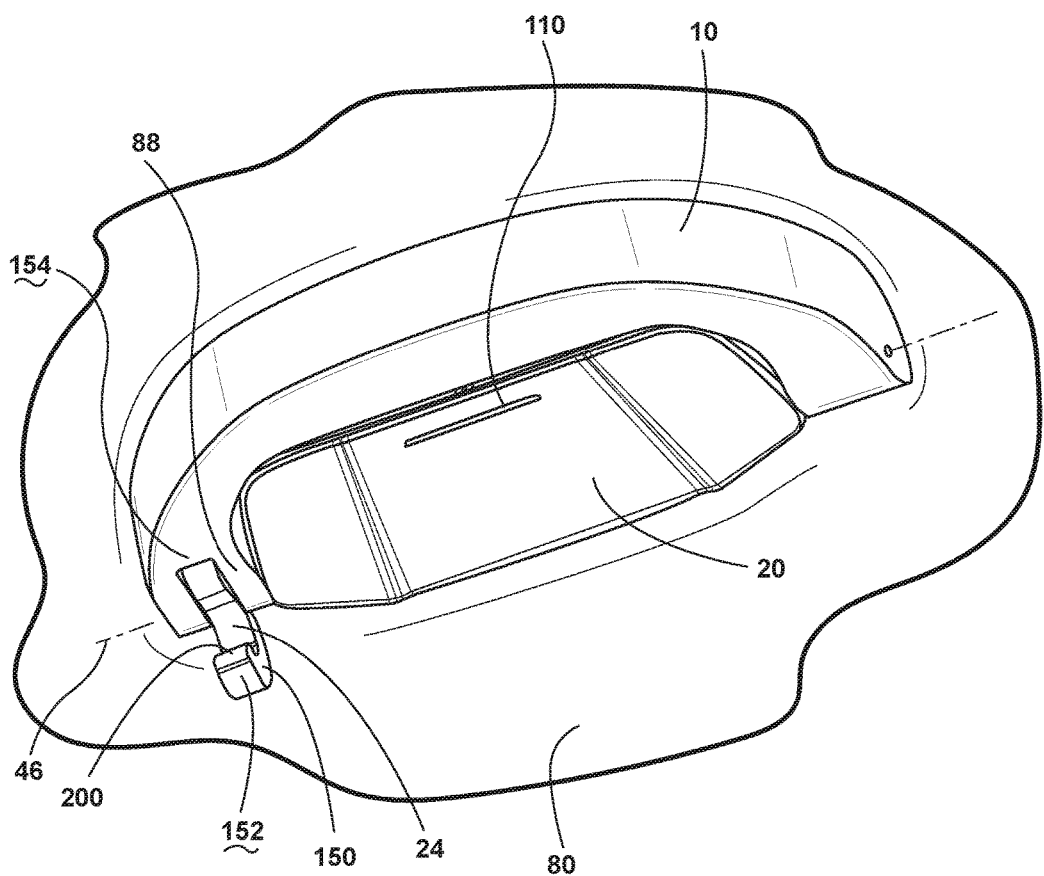
FIG. 6 is a side perspective view of the handle assembly of FIG. 3 with the handle in a stowed position, the housing in a closed position, and the hook in a use position of an aspect of the disclosure.

Referring to FIG. 6, the handle 10 is shown in the stowed position, the housing 20 is shown in the closed position, and the hook 24 is shown in the use position. The hook 24 includes a lip 200 for retaining passenger items on the hook 24.

Figure 7:
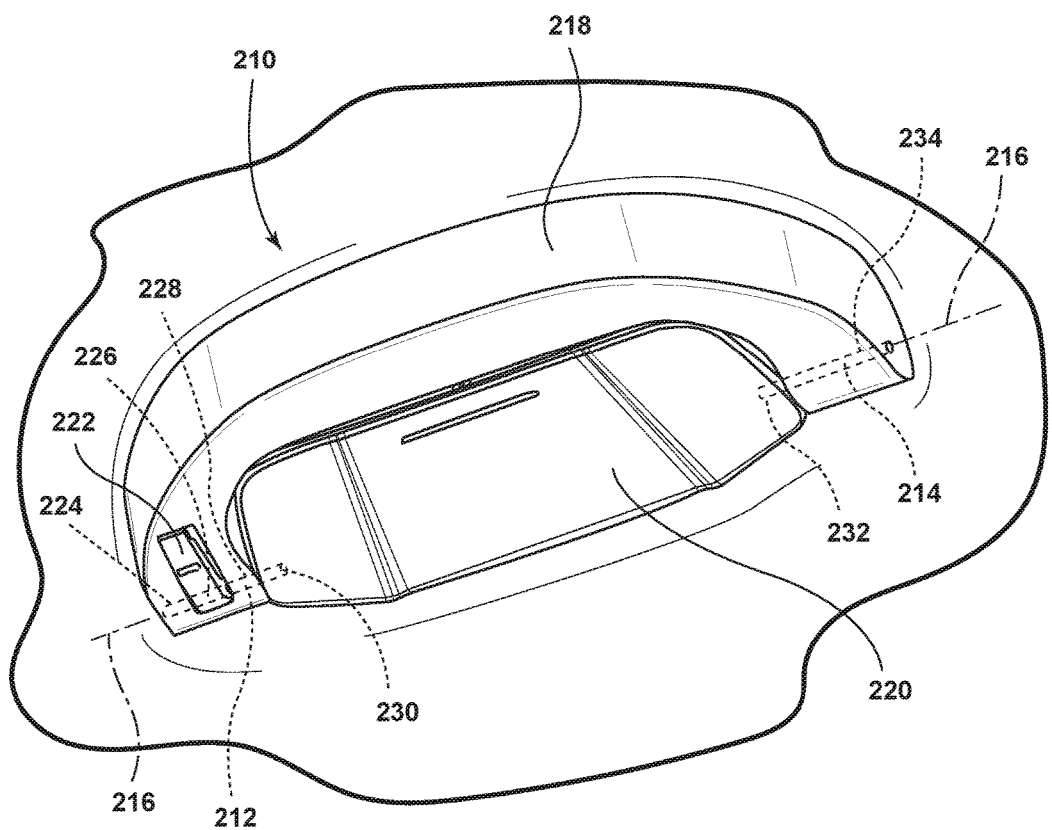
FIG. 7 is a side perspective view of a handle assembly with a handle in a stowed position, a housing in a closed position, and a hook in a first non-use position.
Figure 8:
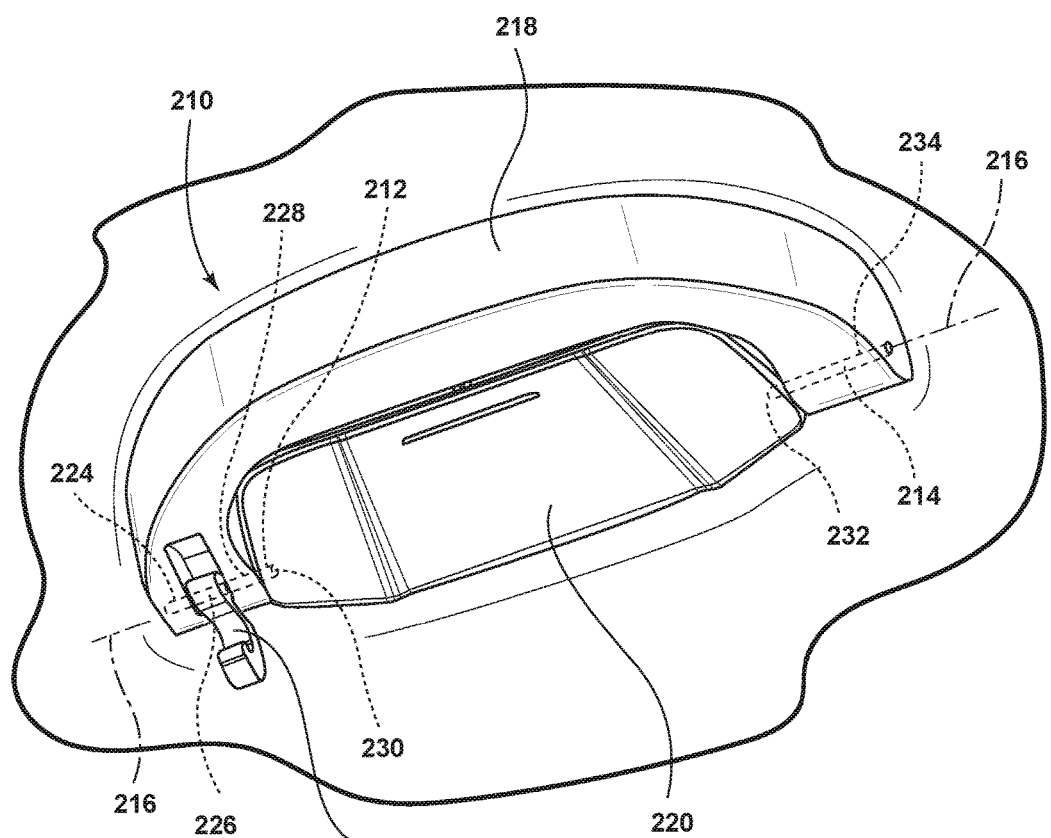
FIG. 8 is a side perspective view of the handle assembly of FIG. 7 with the handle in a stowed position, the housing in a closed position, and the hook in a use position.

Referring to FIGS. 7 and 8, an aspect of the disclosure is shown with a handle assembly 210 with a first pin 212 and a second pin 214 that define an axis 216 about which the handle 218, the housing 220 and the hook 222 are pivotably coupled. With reference to FIG. 7, hook 222 is shown in a first non-use position. With reference to FIG. 8, hook 222 is shown in a use position. In the depicted aspect, first pin 212 protrudes through a first cylindrical recess 224 in the handle 218, a cylindrical recess 226 in the hook 24, a second cylindrical recess 228 in the handle 218, and a first cylindrical recess 230 in the housing 220. The second pin 214 protrudes through a second cylindrical recess 232 in the housing 220 and a third cylindrical recess 234 in the handle 218. With reference again to FIGS. 7 and 8, handle 218 is shown in the stowed position, and housing 220 is shown in the closed position.

A variety of advantages may be derived from the present disclosure. Integration of the housing for the sunglasses and the hook into the handle feature provides the passenger a compact zone for stowing sunglasses and hanging a coat. The handle assembly is an easy and accessible storage solution that may be installed in any row of the vehicle. The handle assembly provides secure sunglass storage near the headliner while the user grabs the handle. The hook provides a place to hang clothes in the use position. A passenger may securely position the hook in the handle in the non-use position when the hook is not being used. The modular solution may be incorporated on any side of the headliner, and it may be used in any row of the vehicle. The handle assembly and the headliner assembly are aesthetically pleasing. The handle assembly concept is designed in such a way that the components/features can be used independently while they are housed in a compact footprint. The handle assembly provides multifunctionality in a compact package.

The vehicle handle assembly offers a modular integrated solution that would offer the user the ease of storing a user item such as sunglasses in a secure closed position in the housing by the headliner while simultaneously allowing the use of the grab handle. The hook integrated in the handle provides a deployable hook for hanging clothes from the headliner and allows the user the option of securely positioning the hook as part of the handle assembly when not in use.

In various aspects of the disclosure, the housing may be shaped to retain passenger items other than sunglasses.

In various aspects of the disclosure, the housing assembly is an integrated modular solution that incorporates a sunglass holder, a coat hook, and a grab handle.

In various aspects of the disclosure, the handle assembly may be modified to add additional features such as reading lights or USB's to the assembly.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle headliner assembly comprising:
   a headliner;
   a handle;
   a housing; and
   a pivotable coupling that defines an axis, wherein the handle and the housing are operably coupled to the pivotable coupling, wherein the handle is selectively rotatable about the pivotable coupling from a stowed position to a deployed position, wherein the housing is selectively rotatable about the pivotable coupling from a closed position to an open position, wherein the pivotable coupling is attached to the headliner, and wherein a push-push mechanism is selectively activated to move the housing between closed and open positions.

2. The vehicle headliner assembly of claim 1, wherein the pivotable coupling comprises a pin that extends through the handle and an edge of the housing.

3. The vehicle headliner assembly of claim 2, wherein the headliner,
   the handle, and the housing are proximate a ceiling and
      the pin is mounted to the ceiling frame.

4. The vehicle headliner assembly of claim 3, wherein the housing is nested within the handle.

5. The vehicle headliner assembly of claim 4, wherein the pivotal coupling comprises a hinge is selectively activated to move the handle between stowed and deployed positions.

6. The vehicle headliner assembly of claim 1, wherein an outer edge of the housing is adjacent to an inner edge of the handle.

7. The vehicle headliner assembly of claim 6, wherein the housing is configured to receive sunglasses.

8. The vehicle headliner assembly of claim 1, further comprising:

a hook, wherein the hook is nested within the handle and wherein the hook is activated from a non-use position to a use position.

9. The vehicle headliner assembly of claim 8, wherein the hook is selectively rotated about an axis between non-use and use positions.

10. The vehicle headliner assembly of claim 8, wherein the hook is attached to the pivotable coupling and wherein the handle, the housing, and the hook are rotatable about the pivotable coupling.

11. The vehicle headliner assembly of claim 10, wherein the pivotable coupling is a pin.

12. A handle assembly for a vehicle comprising:
an elongated member mounted to a vehicle interior;
a handle pivotably coupled to the elongated member; and
a rotatable container pivotably coupled to the elongated member, wherein an inner periphery of the handle surrounds an outer periphery of the rotatable container when the handle is in a stowed position and the rotatable container is in a closed position, and wherein the rotatable container is separately rotatable from the handle.

13. The handle assembly for a vehicle of claim 12, wherein an opening of the rotatable container is accessible when the rotatable container is in an open position and the handle is in the stowed position.

14. The handle assembly for a vehicle of claim 12, wherein the elongated member defines an axis.

15. The handle assembly for a vehicle of claim 12, further comprising:
a hook, wherein the hook is pivotably coupled to the elongated member.

16. The handle assembly for a vehicle of claim 12, wherein an interior volume of the rotatable container is defined by the interior of the rotatable container and a ceiling.

17. A deployable handle assembly comprising:
a pin;
a handle;
a container; and
a hanger, wherein the handle, the container, and the hanger are mounted on the pin and the handle is separately rotatable about the pin between stowed and deployed positions, the container is separately rotatable from the handle about the pin between closed and open positions, the hanger is separately rotatable about the pin between non-use and use positions, and the pin is fixed to a vehicle frame.

18. The deployable handle assembly of claim 17, wherein the pin defines an axis.

19. The deployable handle assembly of claim 18, wherein the handle comprises a first end and a second end, the container is nested within the handle and between the first end and the second end, and the hanger is nested within one of the first and second ends of the handle.

* * * * *